United States Patent
McIlvaine

(10) Patent No.: US 7,100,341 B2
(45) Date of Patent: Sep. 5, 2006

(54) LAMINATE FLOORING WITH CUSTOM IMAGES

(76) Inventor: Bruce McIlvaine, 754 E. Longwood Dr., Lake Forest, IL (US) 60045

( * ) Notice: Subject to any disclaimer, the term of this patent is extended or adjusted under 35 U.S.C. 154(b) by 0 days.

(21) Appl. No.: 10/820,835

(22) Filed: Apr. 8, 2004

(65) Prior Publication Data

US 2005/0083551 A1     Apr. 21, 2005

Related U.S. Application Data

(62) Division of application No. 10/238,206, filed on Sep. 10, 2002, now abandoned.

(51) Int. Cl.
    *E04B 1/00*    (2006.01)
(52) U.S. Cl. .................. 52/745.2; 52/390; 382/100; 156/277
(58) Field of Classification Search ............... 52/311.1, 52/311.2, 403.1, 592.1, 588.1, 390, 747.1, 52/745.2; 428/206, 208, 151, 152, 161; 427/197, 427/203; 144/356; 382/298, 299, 100; 446/124, 446/123, 108, 115; 156/277, 266, 264, 256, 156/71, 64
    See application file for complete search history.

(56) References Cited

U.S. PATENT DOCUMENTS

| | | | | |
|---|---|---|---|---|
| 4,586,714 A | * | 5/1986 | Lenkoff et al. | ......... 273/157 R |
| 4,758,952 A | * | 7/1988 | Harris et al. | ................. 101/487 |
| 5,122,212 A | * | 6/1992 | Ferguson et al. | ........... 156/209 |
| 5,271,200 A | * | 12/1993 | Witt | ............................. 52/391 |
| 6,280,820 B1 | * | 8/2001 | Martino | ....................... 428/151 |
| 6,300,279 B1 | * | 10/2001 | Macedo | ....................... 503/227 |
| 6,327,048 B1 | * | 12/2001 | Wen | ........................ 358/1.18 |
| 6,332,941 B1 | * | 12/2001 | Council et al. | ............. 156/230 |
| 6,386,698 B1 | * | 5/2002 | Suga et al. | .................. 347/103 |
| 6,400,844 B1 | * | 6/2002 | Fan et al. | .................... 382/173 |
| 6,446,413 B1 | * | 9/2002 | Gruber | .................... 52/747.11 |
| 6,493,472 B1 | * | 12/2002 | Takagi et al. | ............... 382/317 |
| 6,504,960 B1 | * | 1/2003 | Takahashi | .................... 382/305 |
| 6,591,579 B1 | * | 7/2003 | Sekulla et al. | ............. 52/749.1 |
| 6,931,811 B1 | * | 8/2005 | Thiers | ........................ 52/592.1 |
| 6,964,722 B1 | * | 11/2005 | Taylor et al. | ................ 156/230 |

* cited by examiner

*Primary Examiner*—Naoko Slack
(74) *Attorney, Agent, or Firm*—Wildman, Harrold, Allen & Dixon LLP

(57) ABSTRACT

A method for creating a laminate floor, wherein a digital image is acquired and segmented into a plurality of sections, such that each section is sized to fit on a laminate flooring plank and contains a distinct portion of the digital image. A digital layout is created using all of the sections and the digital layout is printed. The printed digital layout is secured to a sheet of base material and the sheet of base material is divided into a plurality of flooring planks. The flooring planks are then assembled in a predetermined order and alignment to reproduce the digital image on the laminate floor.

14 Claims, 4 Drawing Sheets

LAMINATE FLOORING WITH CUSTOM IMAGES

CROSS-REFERENCE TO RELATED APPLICATIONS

This application is a divisional of prior application No. 10/238,206, filed Sep. 10, 2002 now abandoned.

FIELD OF THE INVENTION

The present invention relates to laminate flooring. In particular, the present invention relates to laminate flooring that contains custom images and the method for creating the same.

BACKGROUND OF THE INVENTION

Laminate flooring is an extremely durable and resilient flooring. It is typically manufactured in rectangular or square planks that contain a tongue and groove system on the edges of each plank. Multiple planks are then assembled and secured together, such as by gluing or snapping the tongue and groove joints, to cover a flooring area.

Laminate flooring is typically used because it is more durable, wear and stain resistant, and low maintenance than many other types of flooring such as hardwood floors, vinyl flooring, ceramic tiles, etc. For example, laminate flooring does not scratch, dent, wear, absorb liquids, or require refinishing or waxing like typical hardwood floors. In addition, laminate flooring does not scratch, dent, tear, wear, or require waxing like vinyl flooring. Finally, laminate flooring does not scratch, crack, require grouting, or require constant care like ceramic tile flooring. Best of all, typical laminate flooring can be designed to mimic the look of any other type of flooring while retaining its durability, wear and stain resistance, and low maintenance characteristics.

The most common use of laminate flooring is to recreate the look of hardwood flooring. To do this, photographs are taken of various pieces of wood (to reproduce the color and grain pattern of the particular wood). The photographs are then digitized, formatted, and enhanced to create digital images of wood grain that can be used on flooring planks. The digital images are not typically of contiguous portions of the wood grain but are random samples of the wood grain. This is done to more accurately mimic a real hardwood floor where the grain of each plank will not be contiguous with the grain of the piece next to it but will have its own unique grain pattern. The digital images are then printed on a substrate, typically paper, that can be used in the laminate flooring manufacturing process.

Typical laminate flooring planks are made from a base material, such as medium or high density fiber board, with a design surface, such as the printed image described above, on top of the base material, and a protective surface on top of the design surface. The three pieces are then laminated together to form the flooring planks. In addition to these three elements, some flooring may also include a backing surface underneath the base material to provide extra rigidity and warp protection and an impact layer between the base material and the design surface to provide shock absorption and dent protection.

To simplify the manufacturing of laminate flooring planks, manufacturers typically start with a large sheet of the base material, such as a 12'×4' sheet of high density fiber board, rather than having the base material already machined into planks. Multiple images are then arranged into one large layout that will cover the entire sheet. Because the sheet will later be machined into individual planks, spaces are left in between each image where the sheet will be cut or machined so that portions of each image are not lost. The sheet of base material, the design surface, the protective surface, and any other layers that may be used, are then laminated together. Once the layers have been laminated, the sheet of flooring is cut into the individual planks and tongues/grooves are machined into the sides of the planks.

Although attempting to mimic hardwood flooring, unlike real hardwood flooring, laminate flooring does not use unique grain patterns for each and every plank. To do so would be inefficient, expensive, and extremely time consuming. Instead, flooring manufacturers will typically make a predetermined number of grain pattern images only. The idea then is to assemble the planks as randomly as possible (not placing identical grain patterns next to each other) to make the laminate floor look like a real hardwood floor.

Therefore, typical laminate flooring is only made where a predetermined number of identical planks can be reproduced and installed to replicate a random pattern. Because of this, individuals have a limited selection of flooring styles to choose from and are not able to customize or personalize their floors. Therefore, it would be advantageous to have laminate flooring that allows customization and not just random patterns. More particularly, it would be advantageous to have laminate flooring that when assembled would produce a custom image.

SUMMARY OF THE INVENTION

The present invention provides laminate flooring that contains custom images, thereby allowing customization/personalization of the laminate flooring and the method for making the same. Unlike typical laminate flooring, the present invention does not contain a predetermined number of images that are duplicated over and over that need to be installed to form a random pattern. Instead, in the present invention, each plank contains a section of an overall image. The planks are then assembled in a predetermined order and alignment, much like a puzzle, and the overall image is reproduced on the flooring. The laminate flooring of the present invention can generally be made using the typical manufacturing processes described above. A photograph, or other image such as a drawing, painting, etc., that an individual wants placed on their flooring is digitized, formatted, and enhanced to create a digital image with dimensions that will cover the entire flooring surface desired. The digital image is then segmented into individual sections, each of which is sized to be placed on a single plank. The individual sections are then arranged to allow for the spaces described above that are required for machining. The formatted digital image, including each of the individual segments, is then printed on a substrate and used as the design surface in the laminate floor.

In particular, the present invention relates to a method for preparing an image for use on a laminate floor in which a digital image is acquired and segmented into multiple sections. Each section of the digital image is sized to fit on a laminate flooring plank and contains a distinct portion of the digital image. A digital layout is created using the sections and the digital layout is printed for use as the design layer of the laminate floor.

The present invention further relates to a method for creating a laminate floor in which a digital image is acquired and segmented into multiple sections. Each section of the digital image is sized to fit on a laminate flooring plank and contains a distinct portion of the digital image. A digital layout is created using the sections and the digital layout is printed for use as the design layer of the laminate floor. The printed digital layout is secured to a sheet of base material, which is then divided into a plurality of flooring planks. The flooring planks containing the distinct portions of the digital image are them assembled in a predetermined order and alignment to reproduce the digital image on the laminate floor.

DETAILED DESCRIPTION OF THE PREFERRED EMBODIMENT

The embodiments of the present invention shown in the attached drawings provide laminate flooring made with custom images which allows individuals to install customized/personalized laminate flooring that contains photographs, pictures, or other images.

Figure 1:
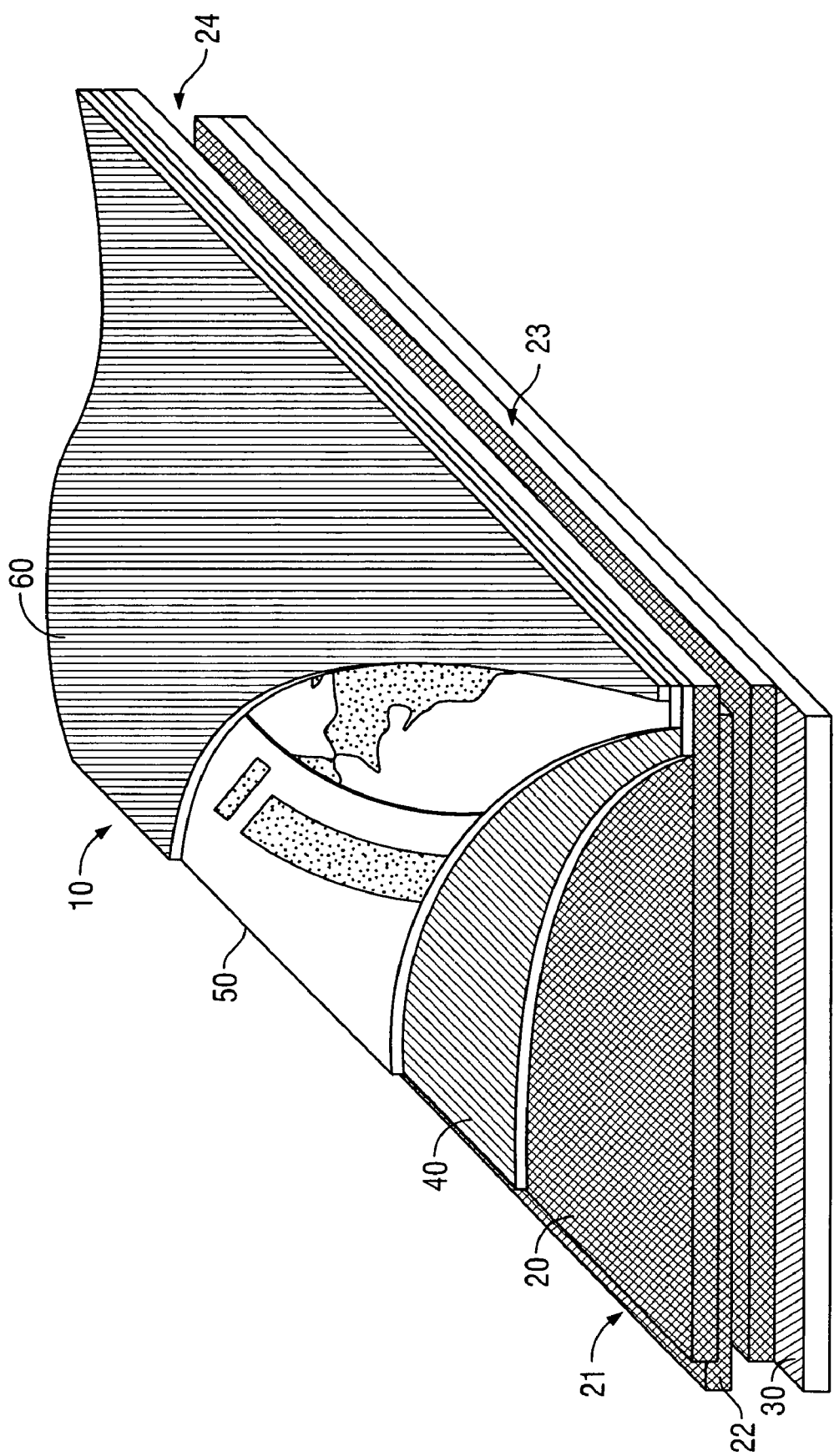
FIG. 1 is a cutaway perspective view of a laminate flooring plank.

Referring now to the drawings in greater detail, in FIG. 1, a laminate flooring plank 10 is shown. The plank 10 is generally rectangular in shape and includes a base layer 20, a backing layer 30, an impact layer 40, a design layer 50, and a protective layer 60, which are laminated together to form the plank 10. It will be understood by those skilled in the art that the planks 10 do not have necessarily have to be rectangular but can be square, octagonal, or any other shape desired. In addition, it is also possible to create a laminate floor using a combination of rectangular, square, and/or other shaped planks. The layers can be laminated together by using laminating techniques that are standard in the flooring industry, such as by placing a glue between each layer to hold the layers together. Multiple planks 10 are then assembled/installed together to form a complete laminate floor.

The base layer 20 forms the base structure of the plank 10. In the preferred embodiment of the invention, the base layer is made from high density fiberboard, however, it can also be made from medium density fiberboard or any other suitable flooring substrate. The base layer 20 also includes a means for assembling multiple planks 10 together to form a complete laminate flooring surface. In the preferred embodiment of the invention, the base layer 20 includes a tongue and groove system that consists of a tongue 22 on at least one side 21 of the base layer 20 and a corresponding groove 24 in at least one side 23 of the base layer 20, opposite the tongue 22. When assembled, the planks 10 are laid next to each other in a manner where the tongue 22 of one plank is inserted into the groove 24 of another plank thereby securing the planks together. It will be understood by those skilled in the art that the assembly means does not have to be a tongue and groove system but can be any type of assembly means which can secure multiple planks together. In addition, the base layer 20 could be made without an assembly system and multiple planks assembled by butting up flat ends of the planks together.

The backing layer 30 is located underneath the base layer 20 and is used to stiffen and control warping of the plank 10. In the preferred embodiment, the backing layer 30 is made from a melamine impregnated fiberboard, however, it can also be made from any other suitable material that can be secured to the base layer 20 and provide additional support for the plank 10. It will be understood by those skilled in the art that while the backing layer 30 is provided in the preferred embodiment to provide additional support to the plank 10 it is not required in order to provide a laminate floor according to the present invention.

The impact layer 40 is located on top of the base layer 20 and is used to provide shock absorption and dent resistance to the plank 10. It will be understood by those skilled in the art that the impact layer can be made from any suitable material that can be secured to the base layer 20 and provide shock absorption and dent resistance for the plank 10, as is well known in the art. In addition, it will be understood by those skilled in the art that while the impact layer 40 is provided in the preferred embodiment to provide shock absorption and dent resistance to the plank 10 it is not required in order to provide a laminate floor according to the current invention.

Figure 4:
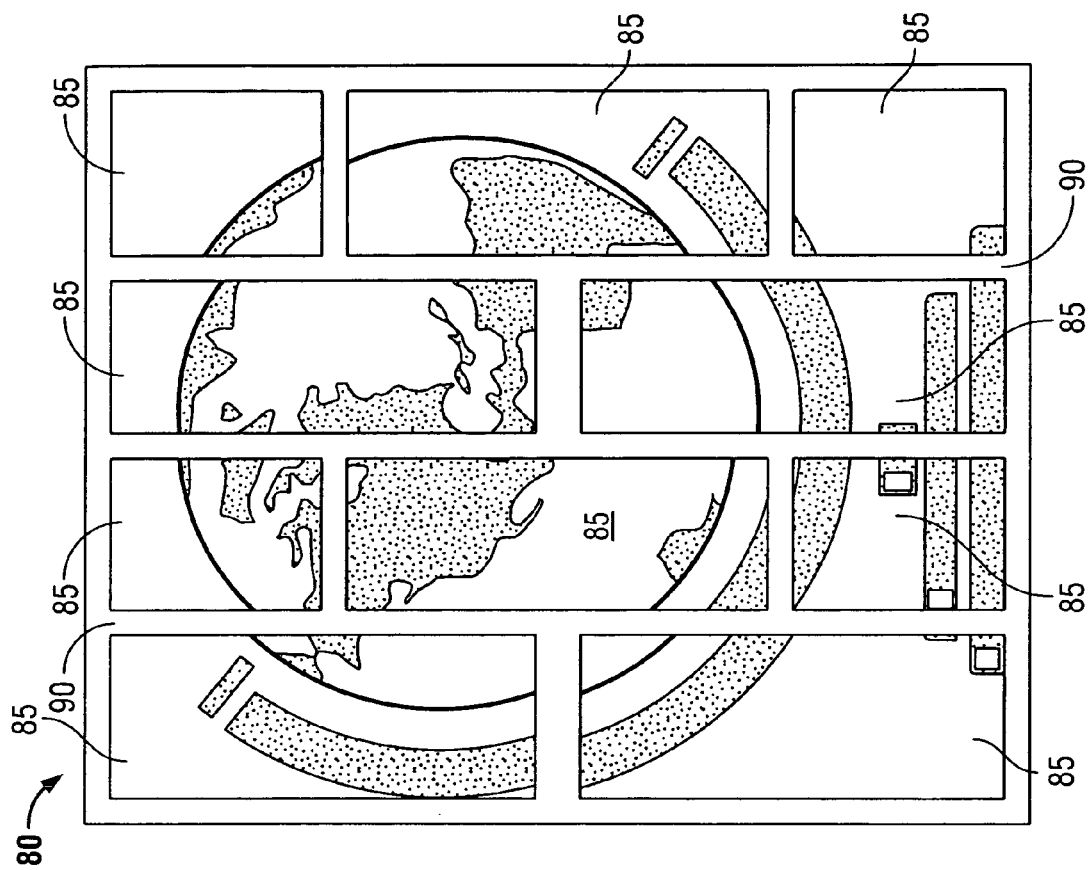
FIG. 4 is an exemplary digital layout as prepared according to the current invention.
Figure 5:
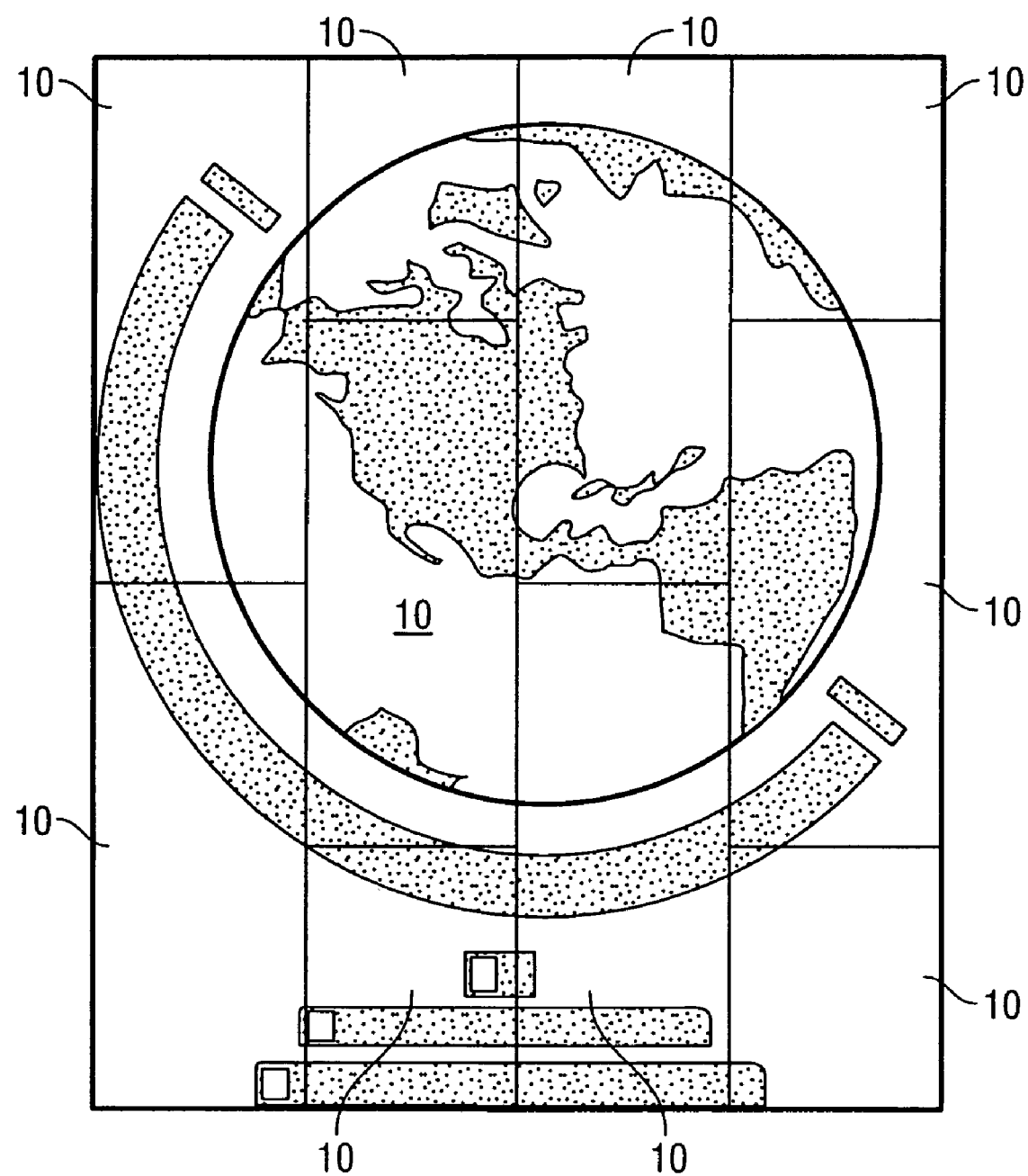
FIG. 5 is an exemplary laminate floor, having multiple laminate flooring planks, with a custom image according to the current invention.

The design layer 50 is located on top of the impact layer 40 and provides the visual design or pattern that is seen on the laminate floor. In the preferred embodiment of the invention, the design layer 50 for each plank contains a distinct section 85 (FIG. 4) of an overall image 70 (FIG. 3), whereby when assembled with other planks that have other distinct sections of the image, will recreate the overall image on the laminate floor, as shown in FIG. 5. As described in further detail below, in the preferred embodiment, the design layer 50 is made from paper that has the distinct section of the overall image printed on it. However, it will be understood by those skilled in the art that the design layer 50 could be any other acceptable substrate that can receive a printed image.

The protective layer 60 is located on top of the design layer 50 and is used to provide wear and stain protection to the plank 10. In the preferred embodiment, the protective layer 60 is a melamine coating, however, it can also be any other suitable protective element that can provide wear, stain, and other protection to the plank 10.

Figure 2:
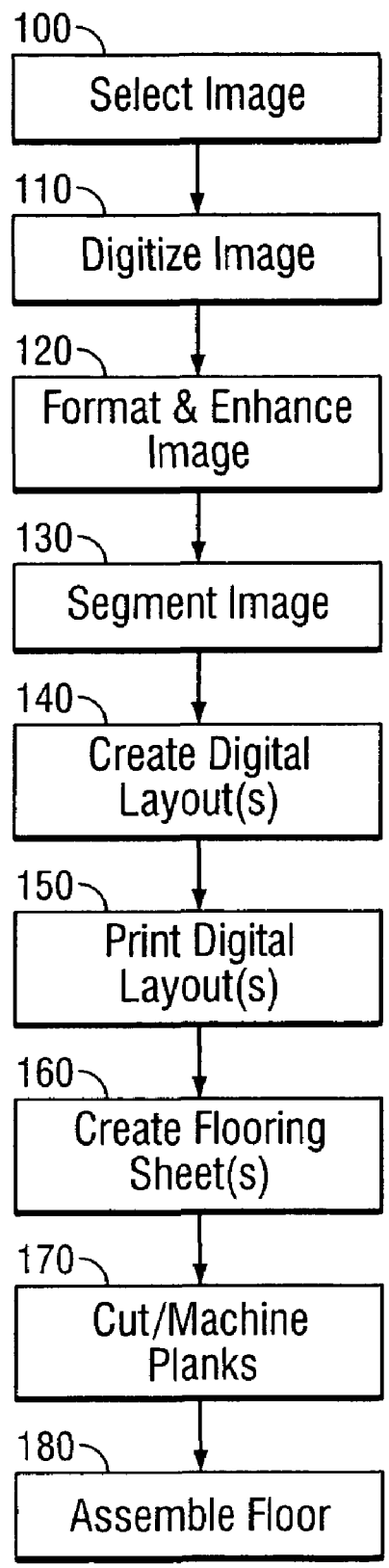
FIG. 2 is a logic flow diagram of the method for creating laminate flooring with custom images according to the current invention.

In FIG. 2 there is illustrated the preferred embodiment of the method for creating laminate flooring with custom images according to the present invention. The method described below assumes that the laminate flooring is manufactured by laminating a large (e.g. 12'×4') sheet of base material and then cutting/machining the large sheet into individual planks. However, it will be understood by those skilled in the art that the method can be modified to cut/machine the individual planks from the base material and then laminate the additional layers to the individual planks using the steps described below.

Figure 3:
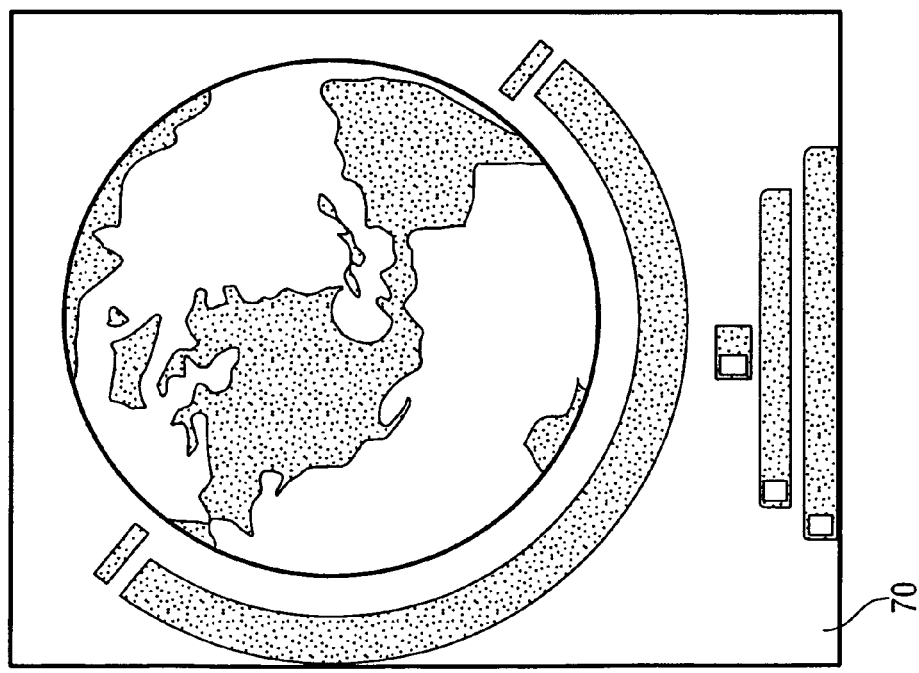
FIG. 3 is an exemplary custom image as can be used to create a laminate floor according to the current invention.

The first step, as shown in process block 100, is to select an image 70, such as the exemplary image shown in FIG. 3. The image 70 can be anything that an individual wishes to place on their laminate flooring such as a photograph, a drawing, a painting, or any other image.

Once the image has been selected it is digitized, as shown in process block 110. This can be done by scanning the image using a standard digital scanner or can be done by any other method of digitizing an image. The method used to digitize the image is not critical to the method of the present invention. If the image selected is already in digital form (i.e. from a digital camera or a digitally created picture), this step would be skipped.

Once the image is available in digital form it is formatted and enhanced, as shown in process block 120. Formatting the digital image may consist of resizing it to the dimensions required to fit the flooring area desired, cropping it to obtain the exact portion of the digital image desired, adjusting the color, or any other formatting steps desired. Enhancing the digital image may consist of sharpening the digital image, adjusting the contrast of the digital image, etc., to enhance the quality of the digital image to a desired quality.

Once the digital image has been formatted and enhanced it is segmented, as shown in process block 130. Segmenting the digital image consists of dividing the digital image it into multiple distinct sections 85 (FIG. 4) so that each distinct section will fit onto a single laminate flooring plank. This is done in such a way that when the flooring planks containing the distinct sections are reassembled the original image will be recreated, as shown in FIG. 5.

Once the digital image has been segmented a digital layout 80 (FIG. 4) is created, as shown in process block 140. Creating the digital layout 80 consists of arranging the distinct sections 85 of the digital image so that they will fit on a sheet of base material, such as is shown in FIG. 4. As can be seen in FIG. 4, spaces 90 are left between each distinct segment of the digital image to allow for the cutting of the individual floor planks from the sheet of base material and the machining of the tongues and grooves into the planks without the loss of any portion of the image. It will be understood by those skilled in the art that if the flooring area to be covered is greater than the area of a sheet of base material, multiple digital layouts will be created that will be used on the multiple sheets of base material required to cover the flooring area.

Once the digital layout has been created, it is printed, as shown in process block 150. As described above, in the preferred embodiment, the digital layout is printed on a sheet of paper that is approximately the same size as the sheet of base material. It will be understood by those skilled in the art that the digital layout could also be printed on multiple pieces of paper that will be arranged on the base material or can be printed on a sheet of paper larger than the base material and later cut to fit the base material. The digital layout can be printed using any standard printing method such as by using a laser printer, an ink jet printer, or any other method of printing that will produce an image of the desired quality. It will be understood by those skilled in the art that the digital layout does not have to be printed on paper but can be printed on any desired substrate that will produce a high enough quality image and can be secured to the plank.

Once the digital layout has been printed a flooring sheet is created, as shown in process block 160. To create the flooring sheet, full sheets of the base layer, the backing layer, the impact layer, the design layer, and the protective layer are arranged in the order described above and laminated together using a lamination process. The design layer used to create the flooring sheet will be the printed digital layout described above. As stated above, it will be understood by those skilled in the art that the backing layer and the impact layer are not required and could be removed from the creation of the flooring sheet.

Once the flooring sheet has been created it is cut and machined to create individual laminate flooring planks, as shown in process block 170. First, the flooring sheet is cut into laminate flooring planks by cutting the flooring sheet along the spaces left in the digital layout described above. This cutting creates the basic laminate flooring planks. Each plank then has a tongue machined into at least one side and a groove machined into at least one side, opposite the tongue.

Once the laminate flooring planks have been cut and machined, the laminate flooring including the image is assembled, as shown in process block 180. During assembly, the planks are laid out in a predetermined order and with a specific alignment so that when they are fully assembled the image will be recreated. Once the planks have been laid out the floor is assembled using the tongue and groove system, or other system used to assemble the laminate floor. Once assembly is complete, the laminate floor will contain the image selected, such as that shown in FIG. 5.

Although the present invention has been described above as it can be used for laminate flooring, it will be understood by those skilled in the art that the invention is not limited to laminate flooring but could be adapted to be used on any type of flooring such as vinyl tiles, ceramic tiles, etc. For example, for vinyl flooring, rather then having flooring tiles that have identical images, or multiple duplicated images, over and over across the floor, the vinyl tiles could be manufactured with a portion of an overall image on each tile. As described above, each vinyl tile would then be placed in a predetermined order and alignment to create the overall image on the floor.

In addition, it will be understood by those skilled in the art that the current invention is not limited to flooring. No matter what material is used, such as laminate planks, vinyl tiles, or ceramic tiles, the material could be used to create a wall or ceiling covering as well.

While the foregoing specification illustrates and describes the preferred embodiments of the invention, it is to be understood that the invention is not limited to the precise construction herein disclosed. The invention can be embodied in other specific forms without departing from the spirit or essential attributes of the invention. Accordingly, reference should be made to the following claims, rather than to the foregoing specification, as indicating the scope of the invention.

I claim:

1. A method for preparing an image for use on a laminate floor, comprising the steps of:
    acquiring a digital image;
    segmenting the digital image into a plurality of sections, wherein each section is sized to fit on a laminate flooring plank and contains a distinct portion of the digital image;
    creating a digital layout using all of the plurality of sections; and
    printing the digital layout.

2. A method for preparing an image for use on a laminate floor, as recited in claim 1, wherein acquiring the digital image comprises the steps of scanning an image and saving the scanned image into a digital format.

3. A method for preparing an image for use on a laminate floor, as recited in claim 1, wherein creating the digital layout comprises the steps of arranging the plurality of sections so that they fit on a sheet of base material and there are predetermined spaces between each section.

4. A method for preparing an image for use on a laminate floor, as recited in claim 1, further comprising the steps of formatting the digital image and enhancing the digital image.

5. A method for preparing an image for use on a laminate floor, as recited in claim 4, wherein formatting the digital image includes the step of resizing the digital image to the dimensions required to fit a flooring area.

6. A method for preparing an image for use on a laminate floor, as recited in claim 4, wherein enhancing the digital image includes the step of sharpening the digital image to obtain a desired image quality.

7. A method for creating a laminate floor, comprising the steps of:
acquiring a digital image;
segmenting the digital image into a plurality of sections, wherein each section is sized to fit on a laminate flooring plank and contains a distinct portion of the digital image;
creating a digital layout using all of the plurality of sections;
printing the digital layout;
securing the printed digital layout to a sheet of base material;
dividing the sheet of base material, with the printed digital layout secured thereon, into a plurality of flooring planks; and
assembling the plurality of flooring planks in a predetermined order and alignment to reproduce the digital image on the laminate floor.

8. A method for creating a laminate floor, as recited in claim 7, wherein acquiring the digital image comprises the steps of scanning an image and saving the scanned image into a digital format.

9. A method for creating a laminate floor, as recited in claim 7, wherein creating the digital layout comprises the steps of arranging the plurality of sections to fit on the sheet of base material with predetermined spaces between each section.

10. A method for creating a laminate floor, as recited in claim 7, further comprising the steps of formatting the digital image and enhancing the digital image.

11. A method for creating a laminate floor, as recited in claim 10, wherein formatting the digital image includes the step of resizing the digital image to the dimensions required to fit a flooring area.

12. A method for creating a laminate floor, as recited in claim 10, wherein enhancing the digital image includes the step of sharpening the digital image to obtain a desired image quality.

13. A method for creating a laminate floor, as recited in claim 7, wherein securing the printed digital layout to the sheet of base material comprises the step of laminating the printed digital layout to the sheet of base material.

14. A method for creating a laminate floor, as recited in claim 7, wherein dividing the laminated sheet of base material into a plurality of floor planks comprises the steps of cutting the laminated sheet of base material into a plurality of floor planks, machining a tongue into one side of each floor plank, and machining a corresponding groove into a second side of each floor plank, opposite the tongue.

* * * * *